(12) United States Patent
Yang

(10) Patent No.: US 8,400,560 B1
(45) Date of Patent: Mar. 19, 2013

(54) VIEWING ANGLE ADJUSTABLE VEHICLE CAMERA DEVICE

(75) Inventor: Cheng-Chi Yang, Changhua (TW)

(73) Assignee: E-Lead Electronic Co., Ltd., Changhua (TW)

( * ) Notice: Subject to any disclaimer, the term of this patent is extended or adjusted under 35 U.S.C. 154(b) by 0 days.

(21) Appl. No.: 13/402,886

(22) Filed: Feb. 23, 2012

(51) Int. Cl.
*H04N 5/225* (2006.01)
*H04N 7/18* (2006.01)

(52) U.S. Cl. .... 348/373; 348/148; 348/151; 348/333.06

(58) Field of Classification Search .................. 348/118, 348/119, 120, 148, 149, 151, 333.06, 373, 348/837, FOR. 171
See application file for complete search history.

(56) References Cited

U.S. PATENT DOCUMENTS

| 6,151,065 | A | * | 11/2000 | Steed et al. | 348/148 |
| 6,762,790 | B1 | * | 7/2004 | Matko et al. | 348/148 |
| 2007/0237517 | A1 | * | 10/2007 | Park | 396/427 |
| 2010/0265328 | A1 | * | 10/2010 | Chou | 348/143 |
| 2011/0032416 | A1 | * | 2/2011 | Naito et al. | 348/374 |

* cited by examiner

*Primary Examiner* — Hung Lam

(57) ABSTRACT

A viewing angle adjustable vehicle camera device comprises a housing, a camera module and an adjustment tenon. The adjustment tenon is disposed behind the camera module to adjust the viewing angle of the camera. The housing is formed with an adjustment slot and a mounting unit for mounting of the adjustment tenon, and the adjustment tenon is movable along the adjustment slot and capable of being fixed to the mounting unit, so that the position of the camera module can be adjusted easily to obtain an optimum viewing angle.

20 Claims, 14 Drawing Sheets

VIEWING ANGLE ADJUSTABLE VEHICLE CAMERA DEVICE

BACKGROUND OF THE INVENTION

1. Field of the Invention

The present invention relates to a vehicle drive camera device, and more particularly to a vehicle camera device which can be adjusted easily to obtain an optimum viewing angle.

2. Description of the Prior Art

Car accident is inevitable, it is important how to reduce the driver's responsibility by proving the fault of the opposite driver when a car accident occurs, and this is why the tachographs are becoming more popular. Tachograph was invented in German in 1925 and is the combination and abbreviation of the German words "tachometer" and "graphik". Conventional tachographs are mechanical and equipped with paper disc capable of recording the driving data of two drivers, including time of drive, rest, instantaneous speed, and etc. Electronic paper disc type tachographs came into existence in 1970's and was additionally equipped with electronic instruments, including display screen, printer, magnetic card, card reader, and etc. Nowadays, electronic tachographs mostly don't use paper discs anymore, and the aforementioned tachographs are not the drive data recorder sold on the market but the instruments similar to the black box on the plane.

The drive data recorders sold on the market cannot be considered as tachographs but are just vehicle camera devices. Due to the poor image quality of the current vehicle camera devices, the video recorded by the vehicle camera devices don't have absolute legal effect. As shown in FIG. 1, a conventional camera device 9 comprises a master chip 94, a video capturing device 91 connected to the input terminal of the master chip 94, a power source 98 and a housing mounted on a vehicle. The camera device 9 is further provided with an encoder 93 connected to the video capturing device 91, a memory 92 connected to the master chip 94, the encoder 93 and the video capturing device 91, a data port 97 connected to the memory 92, a manual switch 95 connected to the power source 98, and an impact switch 96. This conventional vehicle camera device 9 is still incapable of adjusting the viewing angle, which is also the problem that many of the current vehicle camera devices have.

The present invention has arisen to mitigate and/or obviate the afore-described disadvantages.

SUMMARY OF THE INVENTION

The primary object of the present invention is to provide a vehicle camera device which can be adjusted easily to obtain an optimum viewing angle.

To obtain the above object, a viewing angle adjustable vehicle camera device in accordance with the present invention comprises a housing, a camera module and an adjustment tenon.

The housing is formed in the front thereof with an opening, and in the center of the opening is defined a viewing aperture for allowing the camera module to record video, in the opening are formed two slide grooves which provide space for the camera module to rotate.

The camera module includes a base, a camera, and a first bus trunk, the base is provided at a front surface thereof with a central cylinder and two rotary shafts around a periphery of the central cylinder, the rotary shafts are inserted in the slide grooves, the camera is received in the central cylinder of the base, and the first bus trunk allows the camera module to output signals.

The adjustment tenon is disposed behind the camera module to adjust the viewing angle of the camera.

The viewing angle adjustable vehicle camera device is characterized in that: the adjustment tenon is connected to the camera module, and the rotary shafts serve as fulcrums of the rotary shafts during viewing angle adjustment, the housing is formed with an adjustment slot and a mounting unit for mounting of the adjustment tenon, and the adjustment tenon is movable along the adjustment slot and capable of being fixed to the mounting unit.

The present invention can be further provided with an elastic member which has both ends abutted against the inner surface of the opening of the housing and the camera module, respectively. The elastic member pushes the adjustment tenon backward, making it easier for the adjustment tenon to fix to mounting unit.

The present invention can be further provided with a vehicle drive recording module to receive and record the video taken by the camera module.

The housing is provided with a plurality of engaging grooves, and the adjustment tenon is provided on a rear surface thereof with at least one horizontal rib to engage with one of the engaging grooves of the mounting unit.

The opening is V-shaped.

The vehicle drive recording module is a vehicle audio.

The vehicle drive recording module is disposed in the housing.

The vehicle drive recording module is a function module capable of recording GPS position and acceleration data.

A display is disposed at the rear of the housing and connected to the camera module.

DETAILED DESCRIPTION OF THE PREFERRED EMBODIMENTS

Figure 1:
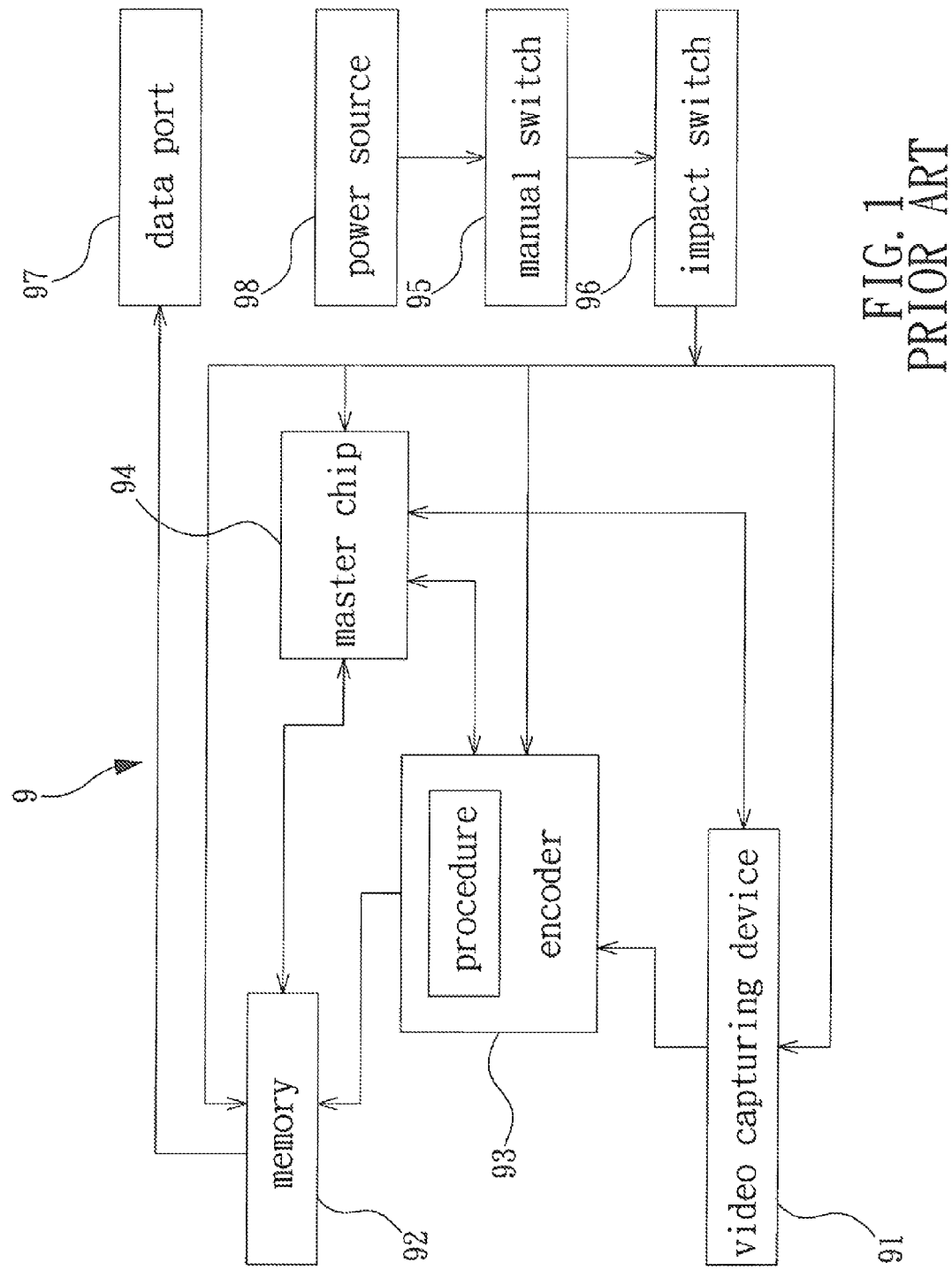
FIG. 1 is a flow chart view showing a conventional vehicle camera device.
Figure 2:
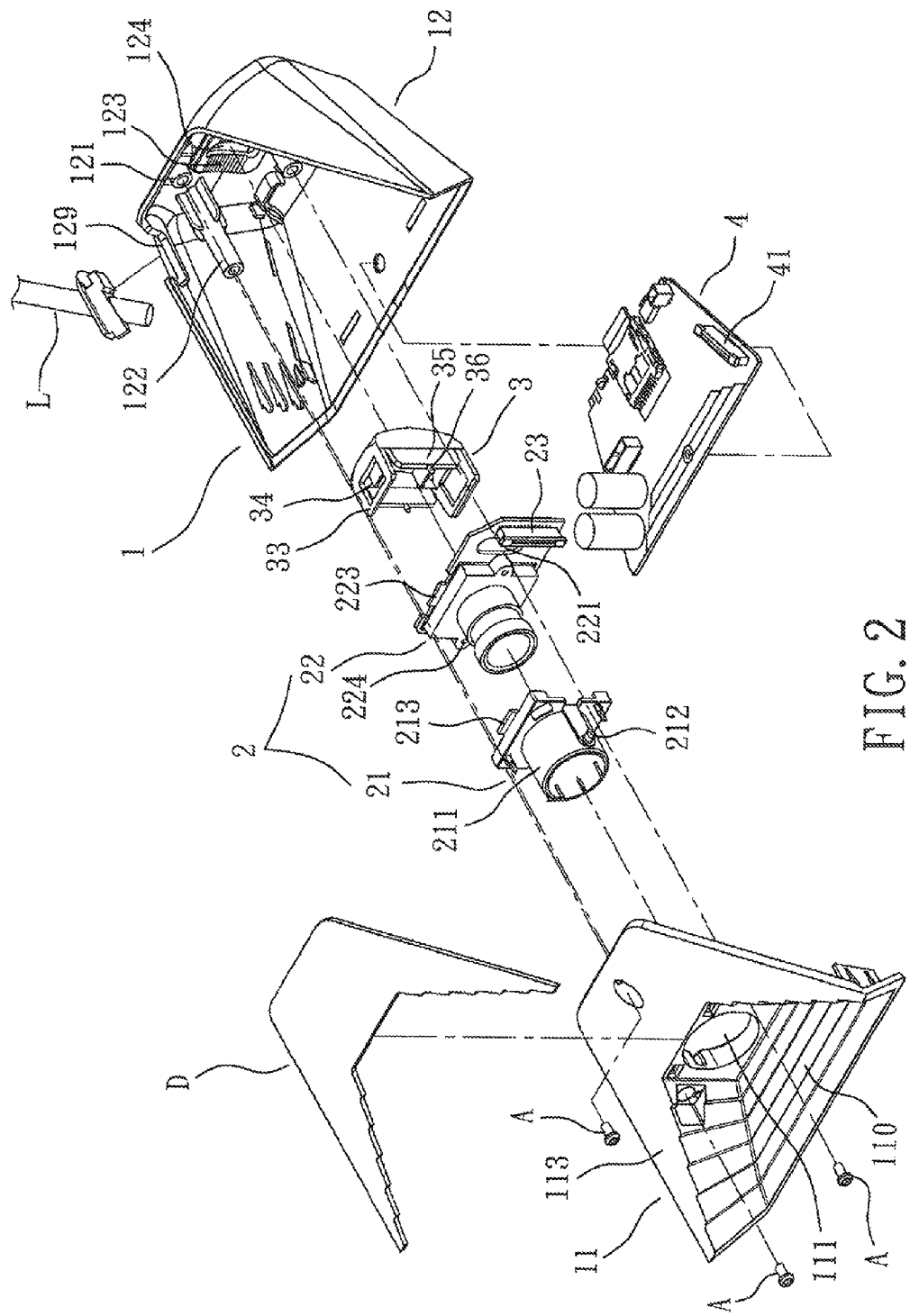
FIG. 2 is an exploded view of a viewing angle adjustable vehicle camera device in accordance with a first embodiment of the present invention.
Figure 3:
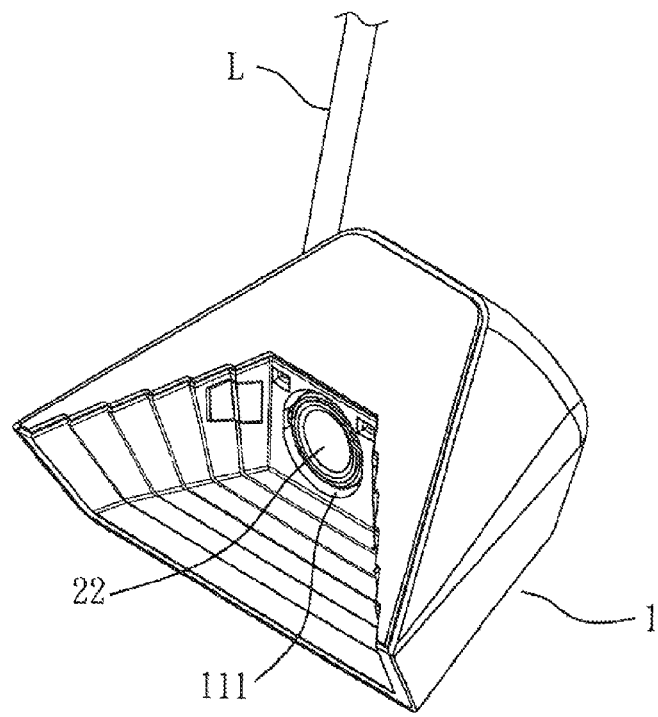
FIG. 3 is a first assembly view of the viewing angle adjustable vehicle camera device in accordance with the first embodiment of the present invention.

The present invention will be clearer from the following description when viewed together with the accompanying drawings, which show, for purpose of illustrations only, the preferred embodiment in accordance with the present invention.

Referring to FIGS. 2-8, a viewing angle adjustable vehicle camera device in accordance with a first embodiment of the present invention comprises a housing 1, a camera module 2 and an adjustment tenon 3.

The housing 1 is formed in the front thereof with a V-shaped opening 110, and in the center of the opening 110 is defined a viewing aperture 111 for allowing the camera module 2 to record video. In the opening 110 are formed two slide grooves 112 which provide space for the camera module 2 to rotate.

The camera module 2 includes a base 21, a camera 22, and a first bus trunk 23. The base 21 is provided at the front surface thereof with a central cylinder 211 and two rotary shafts 212 around the periphery of the central cylinder 211. The rotary shafts 212 are inserted in the slide grooves 112. The camera 22 is received in the central cylinder 211 of the base 21 and formed with at least one lateral hole 221. The first bus trunk 23 allows the camera module 2 to output signals.

The adjustment tenon 3 is disposed behind the camera module 2 to adjust the viewing angle of the camera 22.

The present invention is characterized in that:

The adjustment tenon 3 is connected to the camera module 2, and the rotary shafts 212 serve as fulcrums of the rotary shafts 212 during adjustment. The housing 1 is formed with an adjustment slot 124 and a mounting unit 123 for mounting of the adjustment tenon 3, and the adjustment tenon 3 is movable along the adjustment slot 124 and can be fixed to the mounting unit 123.

The housing 1 includes a front cover 11 and a rear cover 12. The front cover 11 is formed with a top surface 113 which is located above the opening 110 and the viewing aperture 111. A double side adhesive tape D is attached to the top surface 113 to adhere the housing 1 to the windshield W of a vehicle. The front cover 11 is provided on the inner surface thereof with a first fixing pin 114 and at least one second fixing pin 115. The rear cover 12 is provided with a third fixing pin 121 and at least one fourth fixing pin 122. The first fixing pin 114 and the third fixing pin 121 are fixed to each other by a screw A, and the second and fourth fixing pins 115 and 122 are also fixed to each other by a screw A, so that the front and rear covers 11, 12 are assembled to each other.

Figure 4:
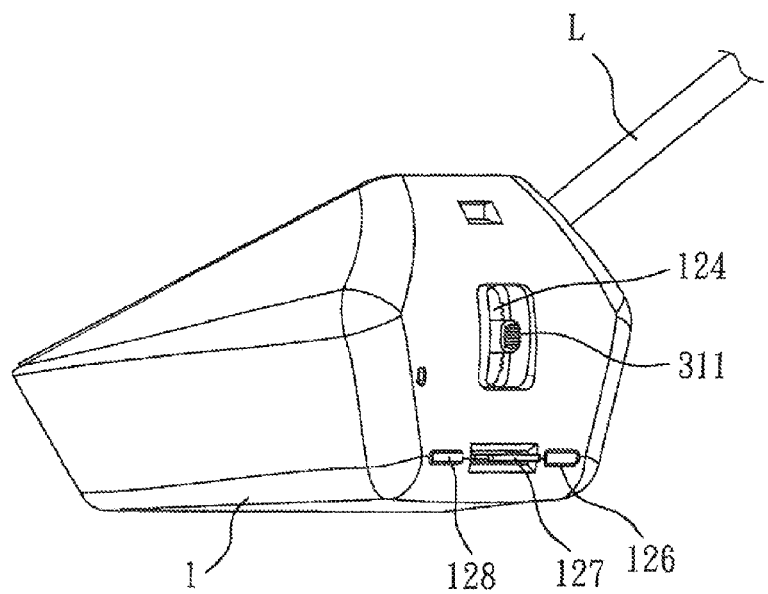
FIG. 4 is a second assembly view of the viewing angle adjustable vehicle camera device in accordance with the first embodiment of the present invention.
Figure 5:
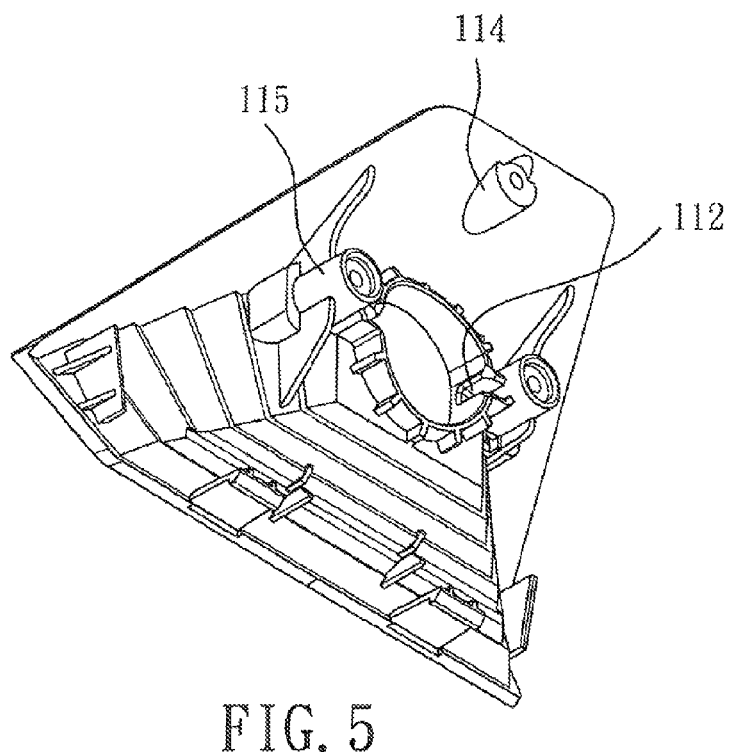
FIG. 5 is a perspective view showing the front cover of the housing in accordance with the first embodiment of the present invention.
Figure 6:
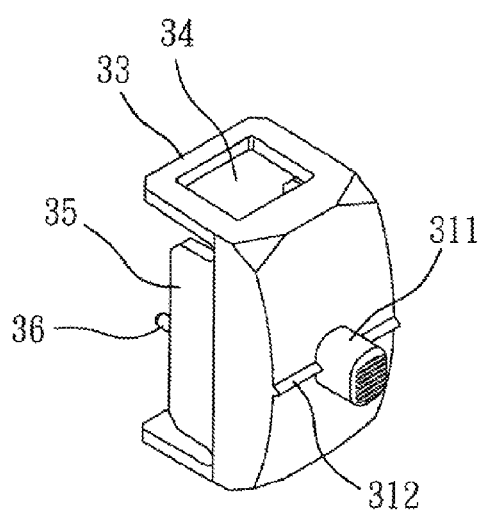
FIG. 6 is a perspective view of an adjustment tenon of the vehicle camera device in accordance with the first embodiment of the present invention.
Figure 7:
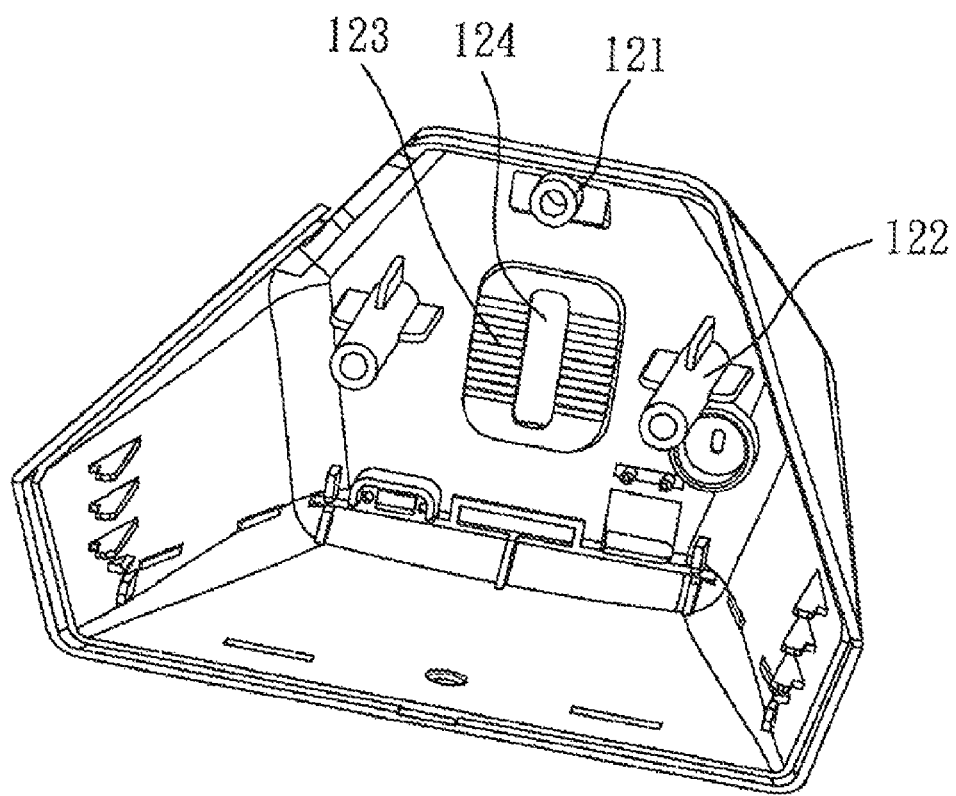
FIG. 7 is an illustrative view showing the rear cover of the housing of the vehicle camera device in accordance with the first embodiment of the present invention.

The housing 1 is provided with a recording button 126 (as shown in FIG. 4) for controlling the camera module 2 to record video, a memory card slot 127 for insertion of a memory card to save the video taken by the camera module 2, and a power source button 128 for turning on/off the vehicle camera device.

The housing 1 is further provided with at least one wire port 129 for insertion of at least one wire L, so that the wire L can be connected to other equipment, for example, the wire L can be connected to a display (not shown) to display the video taken by the camera module 2.

The mounting unit 123 is provided with a plurality of engaging grooves.

The adjustment tenon 3 is provided on the rear surface thereof with at least one horizontal rib 312 to engage with one of the engaging grooves of the mounting unit 123.

Two first lateral boards 33 extend forward from the upper and lower edges of a surface of the adjustment tenon 3 facing the camera module 2, respectively, and two second lateral boards 35 extend forward from the left and right edges of the surface of the adjustment tenon 3 facing the camera module 2, respectively. Each of the first lateral boards 33 is formed with a positioning hole 34 for insertion of the first positioning projections 213 formed on the upper and lower edges of the base 21, and the second positioning projections 223 formed on the upper and lower edges of the camera 22, so as to restrict the camera module 2 in the longitudinal direction. Each of the second lateral boards 35 is formed with a positioning pin 36 which is inserted in flange holes 224 formed at both sides of the camera 22 to restrict the camera 22 in the transverse direction.

The second and fourth fixing pins 115, 122 are inserted through the lateral hole 221 of the camera 22 and screwed with the screws A.

Figure 8:
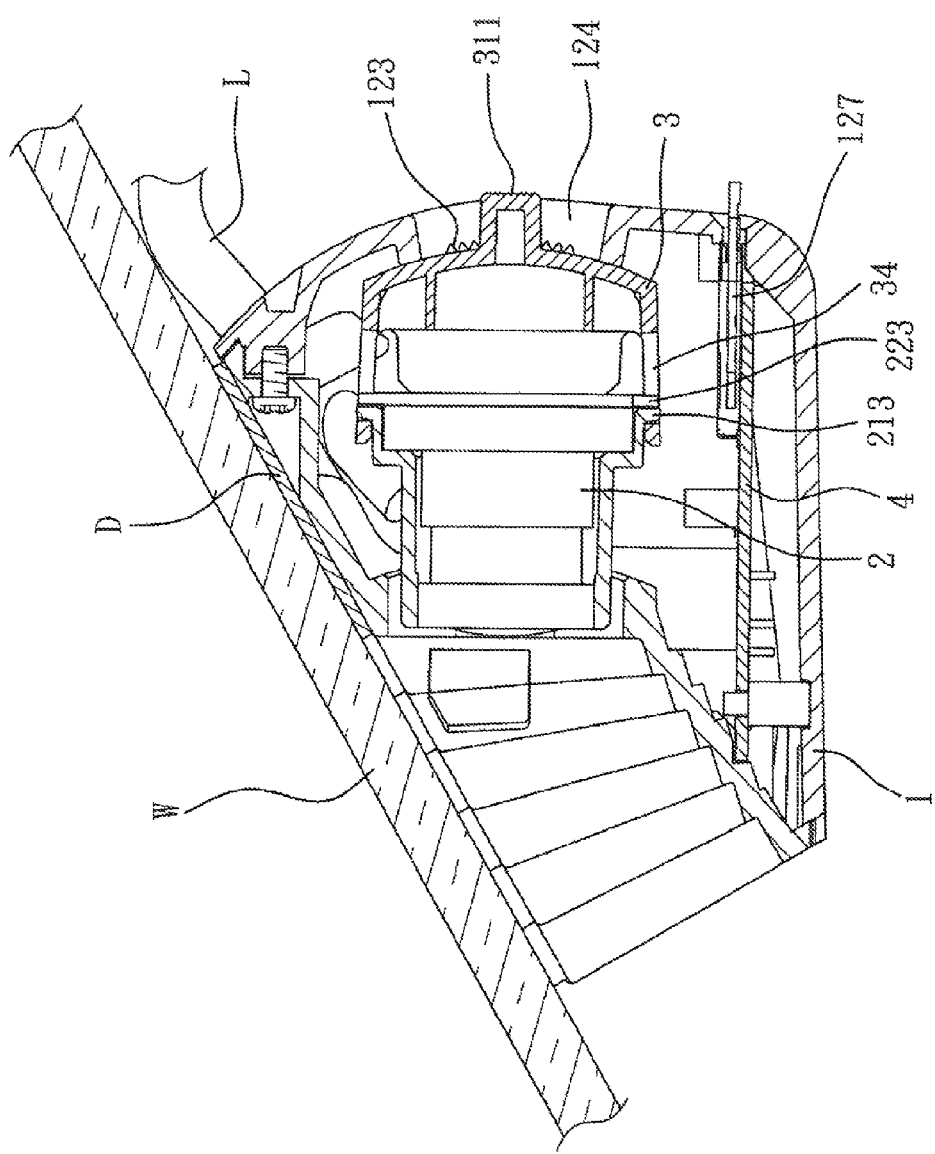
FIG. 8 is a cross sectional view of the vehicle camera device in accordance with the first embodiment of the present invention.
Figure 9:
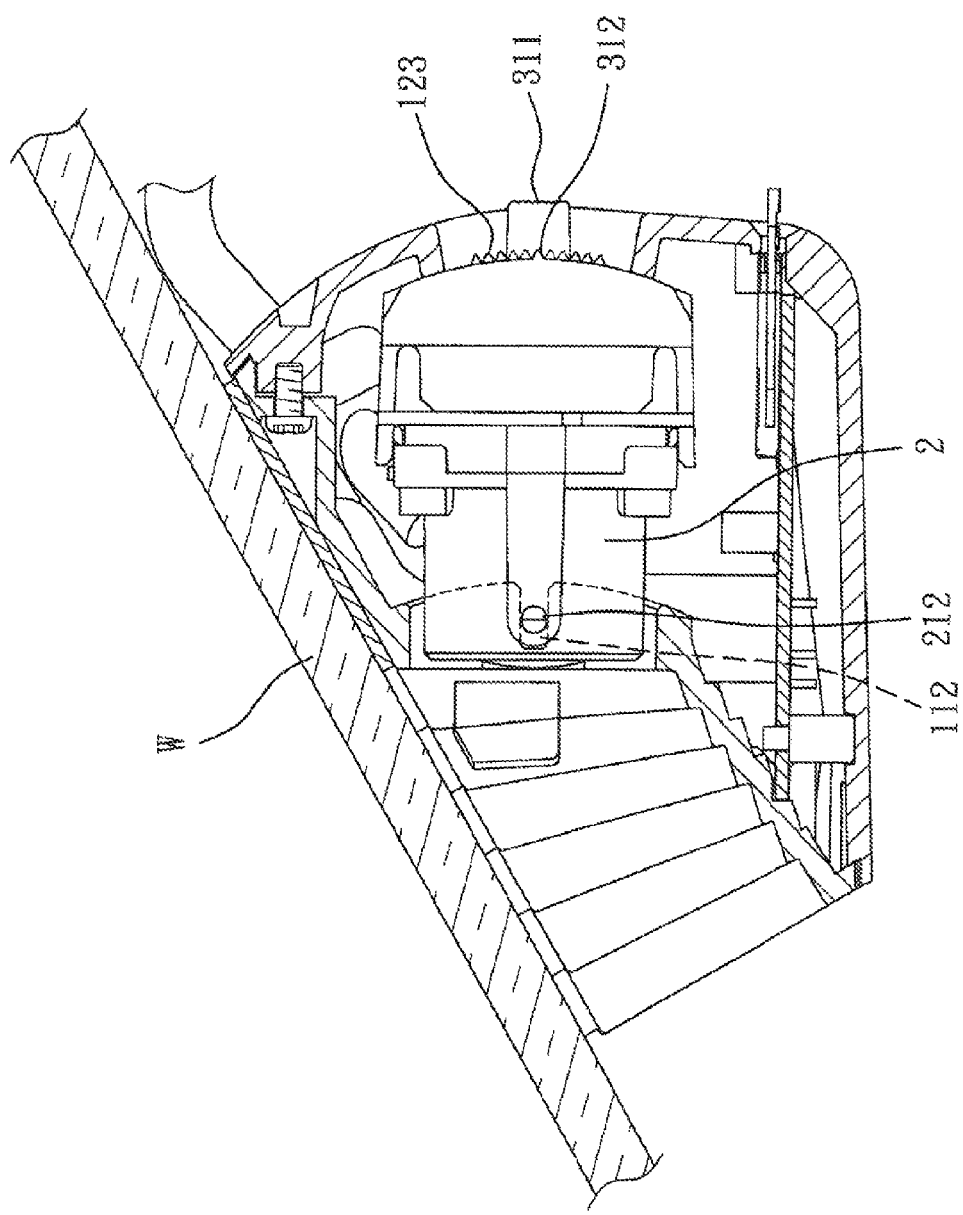
FIG. 9 is a first operational view of the vehicle camera device in accordance with the first embodiment of the present invention.
Figure 10:
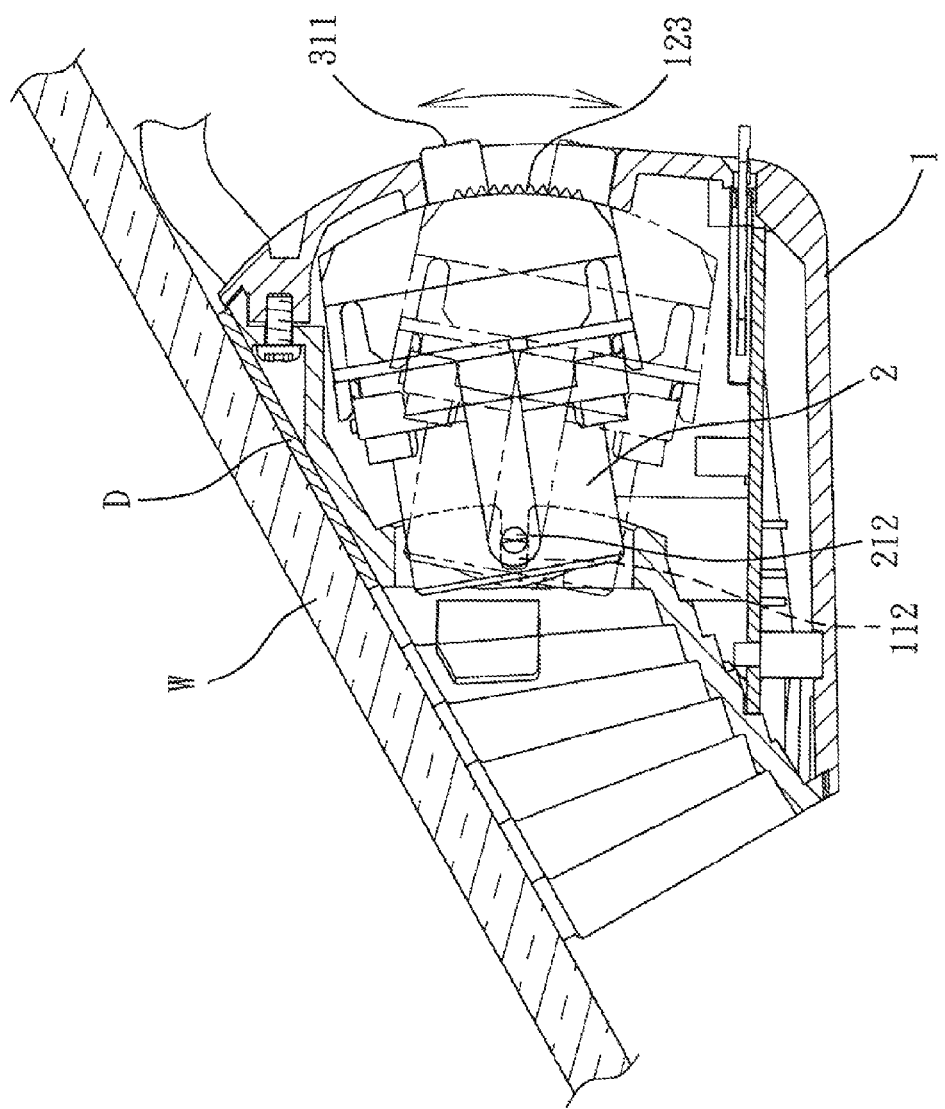
FIG. 10 is a second operational view of the vehicle camera device in accordance with the first embodiment of the present invention.

To adjust viewing angle, as shown in FIGS. 8-10, the user can push a press button 311 of the adjustment tenon 3 to make the adjustment tenon 3 move within the adjustment slot 124, the camera 22 is caused to move together with the adjustment tenon 3, and consequently the viewing angle of the camera 22 is adjusted. When the viewing angle is adjusted to a desired position, the user can release the adjustment tenon 3, the horizontal rib 312 will be engaged with the mounting unit 123, so that the viewing angle of the camera is fixed.

Figure 11:
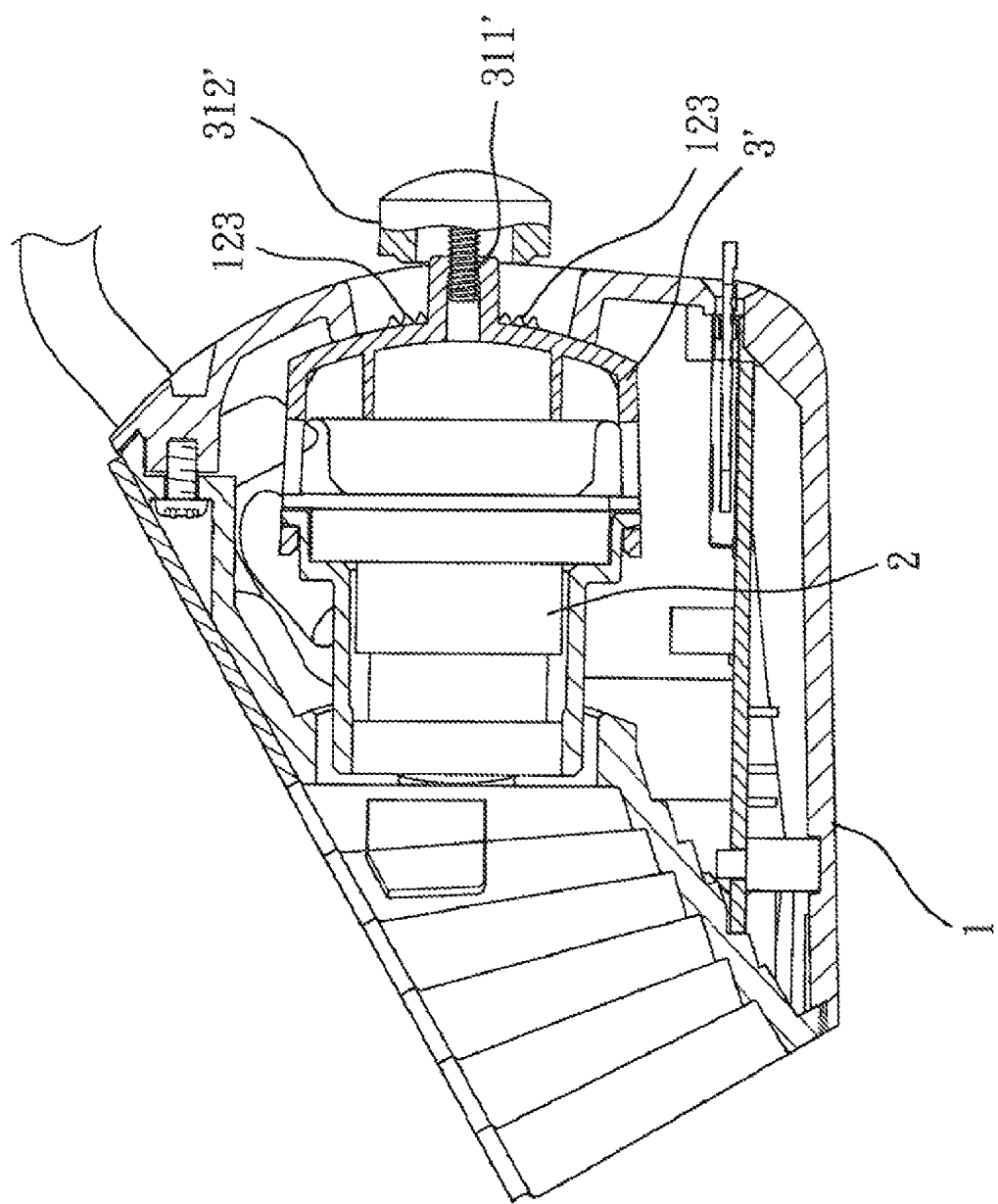
FIG. 11 shows that the vehicle camera device in accordance with the present invention is formed with threaded hole in which being screwed a bolt.
Figure 12:
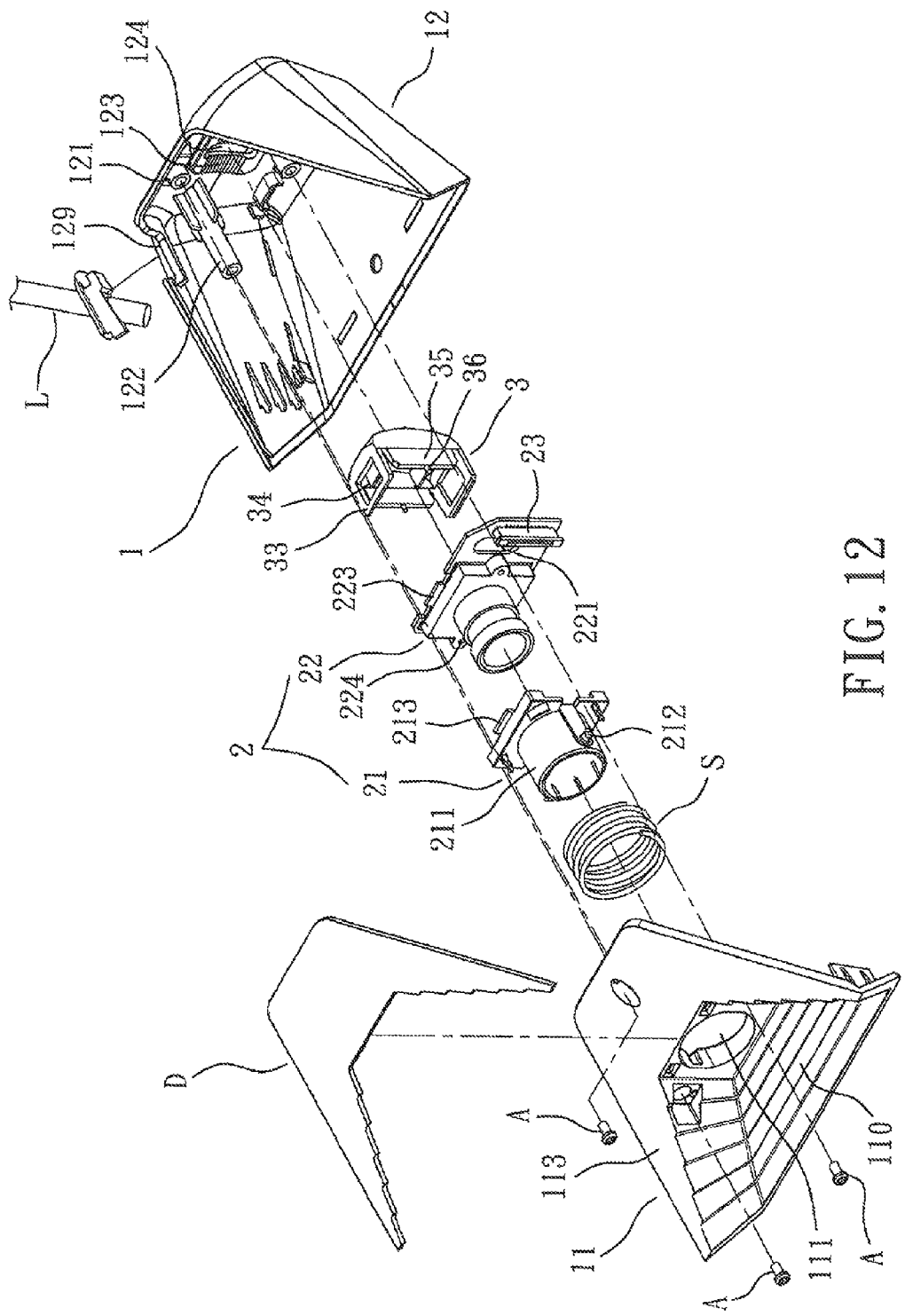
FIG. 12 is an exploded view of a viewing angle adjustable vehicle camera device in accordance with a second embodiment of the present invention.

FIG. 11 shows another adjustment tenon 3' which is formed with a threaded hole 311' in which being screwed a bolt 312', so that the adjustment tenon 3' can be more stably fixed in the mounting unit 123 of the housing 1.

Referring to FIGS. 12-15, a second embodiment of the present invention is shown and is similar to the first embodiment. The second embodiment of the vehicle camera device comprises: a housing 1, a camera module 2, an elastic member S which is a spring or a leaf spring, and an adjustment tenon 3.

The housing 1 is formed in the front thereof with a V-shaped opening 110, and in the center of the opening 110 is defined a viewing aperture 111 for allowing the camera module 2 to record video. In the opening 110 are formed two slide grooves 112 which provide space for the camera module 2 to rotate.

The camera module 2 includes a base 21, a camera 22, and a first bus trunk 23. The base 21 is provided at the front surface thereof with a central cylinder 211 and two rotary shafts 212 around the periphery of the central cylinder 211. The rotary shafts 212 are inserted in the slide grooves 112. The camera 22 is received in the central cylinder 211 of the base 21 and formed with at least one lateral hole 221. The first bus trunk 23 allows the camera module 2 to output signals.

The elastic member S has both ends abutted against the inner surface of the opening 110 of the housing 1 and the camera module 2, respectively.

The adjustment tenon 3 is disposed behind the camera module 2 to adjust the viewing angle of the camera 22.

The present invention is characterized in that:

The adjustment tenon 3 is connected to the camera module 2, and the rotary shafts 212 serve as fulcrums of the rotary shafts 212 during adjustment. The housing 1 is formed with an adjustment slot 124 and a mounting unit 123 for mounting of the adjustment tenon 3, and the adjustment tenon 3 is movable along the adjustment slot 124 and can be fixed to the mounting unit 123.

Figure 13:
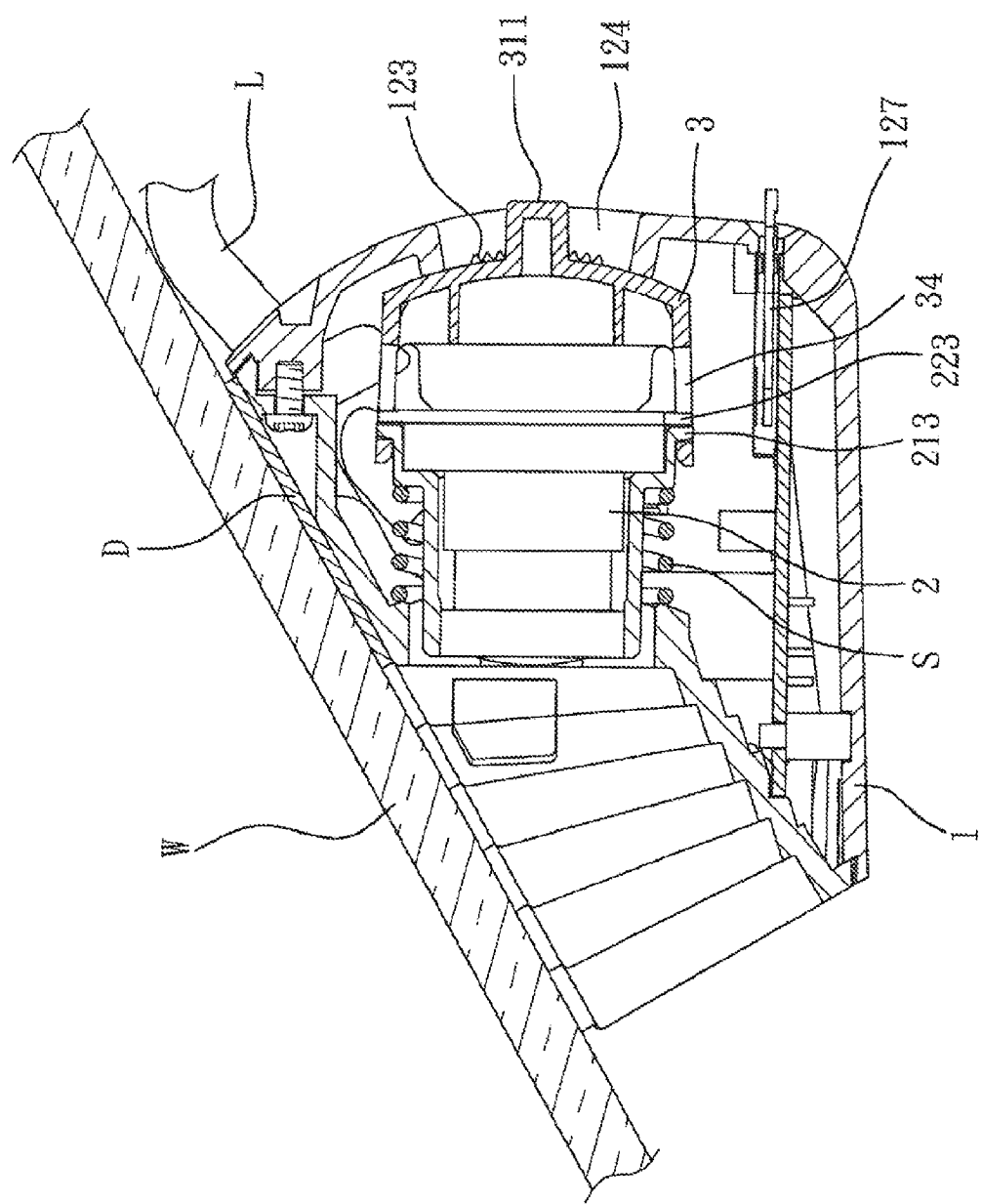
FIG. 13 is a cross sectional view of the vehicle camera device in accordance with the second embodiment of the present invention.
Figure 14:
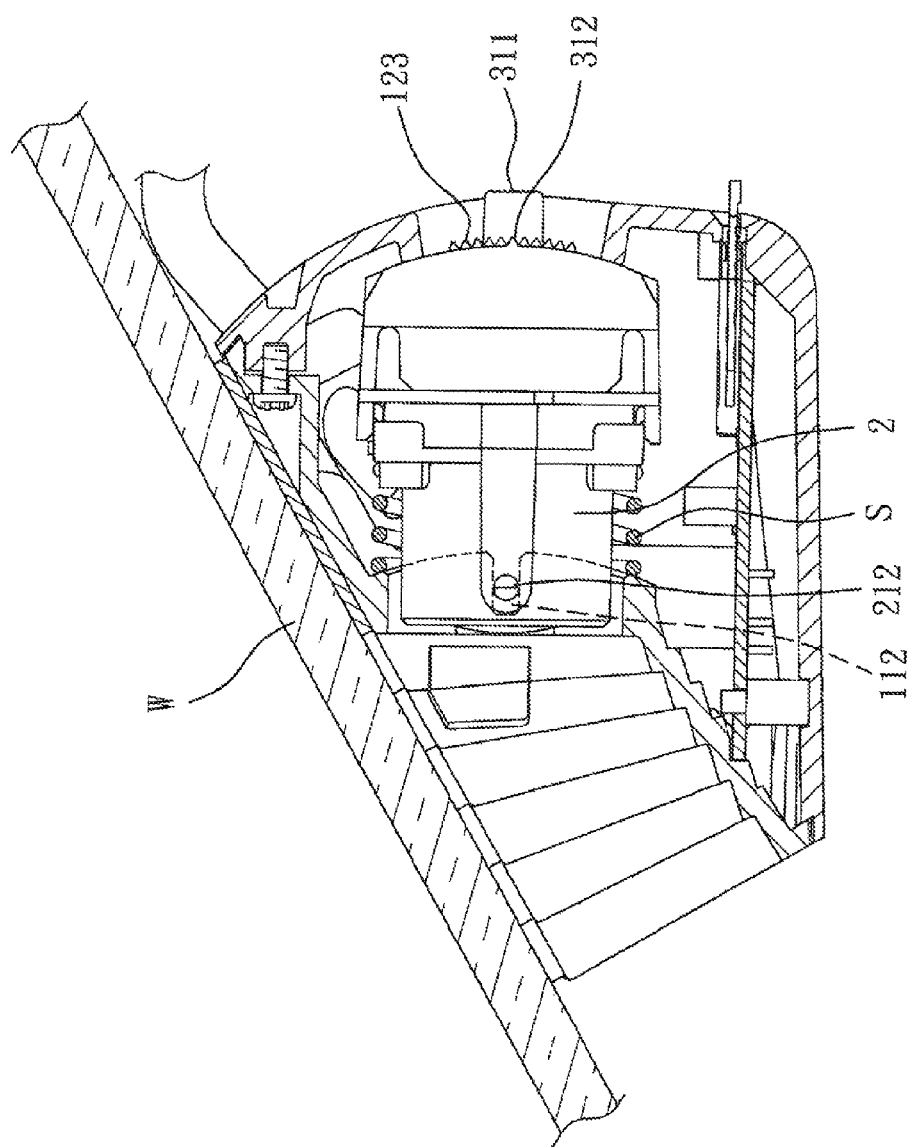
FIG. 14 is a first operational view of the vehicle camera device in accordance with the second embodiment of the present invention.
Figure 15:
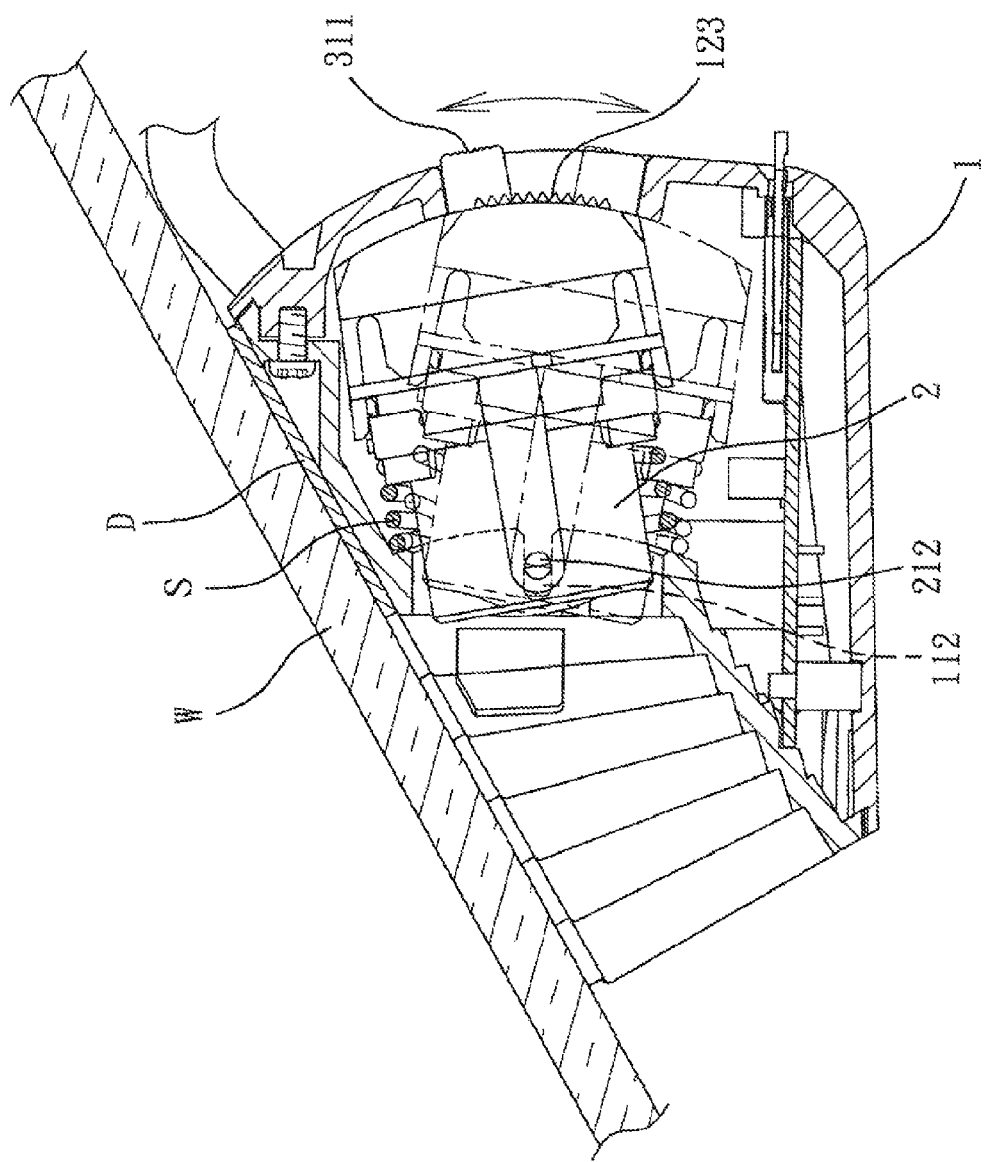
FIG. 15 is a second operational view of the vehicle camera device in accordance with the second embodiment of the present invention.

To adjust viewing angle, as shown in FIGS. 13-15, the user can push a press button 311 of the adjustment tenon 3 to make the adjustment tenon 3 move within the adjustment slot 124, the camera 22 is caused to move together with the adjustment tenon 3, and consequently the viewing angle of the camera 22 is adjusted. When the viewing angle is adjusted to a desired position, the user can release the adjustment tenon 3, the elastic member S will push the camera module 2 and the adjustment tenon 3 backward, so that make it easier for the horizontal rib 312 to engage with the mounting unit 123, and thus the viewing angle of the camera is fixed.

Figure 16:
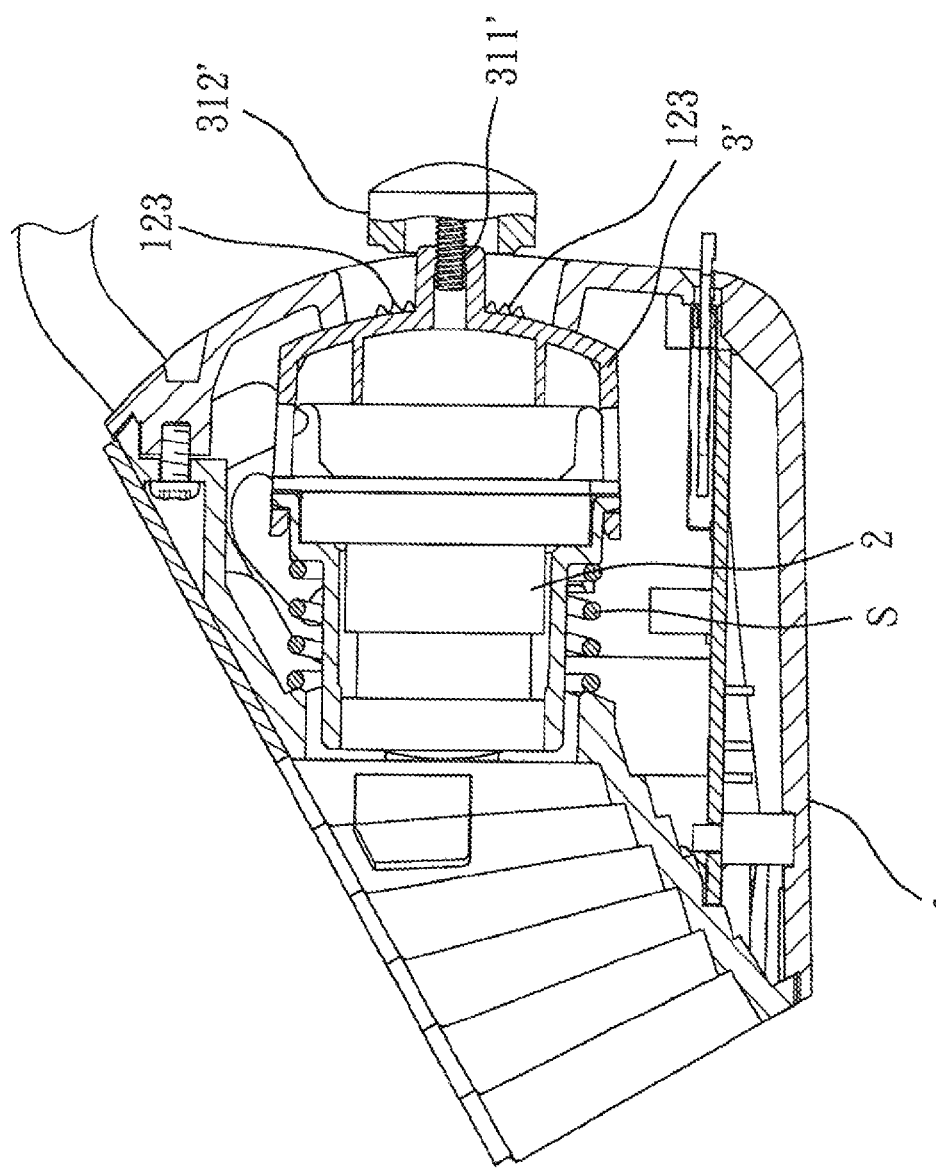
FIG. 16 shows that the vehicle camera device in accordance with the second embodiment of the present invention is formed with threaded hole in which being screwed a bolt.

FIG. 16 shows another adjustment tenon 3' which is formed with a threaded hole 311' in which being screwed a bolt 312', so that the adjustment tenon 3' can be more stably fixed in the mounting unit 123 of the housing 1.

The first and second embodiments of the present invention can further be provided with a vehicle drive recording module 4, please refer back to FIGS. 2-8, namely, the present invention comprises: a housing 1, a camera module 2, an adjustment tenon 3, and the vehicle drive recording module 4.

The housing 1 is formed in the front thereof with a V-shaped opening 110, and in the center of the opening 110 is defined a viewing aperture 111 for allowing the camera module 2 to record video. In the opening 110 are formed two slide grooves 112 which provide space for the camera module 2 to rotate.

The camera module 2 includes a base 21, a camera 22, and a first bus trunk 23. The base 21 is provided at the front surface thereof with a central cylinder 211 and two rotary shafts 212 around the periphery of the central cylinder 211. The rotary shafts 212 are inserted in the slide grooves 112. The camera 22 is received in the central cylinder 211 of the base 21 and formed with at least one lateral hole 221. The first bus trunk 23 allows the camera module 2 to output signals.

The adjustment tenon 3 is disposed behind the camera module 2 to adjust the viewing angle of the camera 22.

The vehicle drive recording module 4 is disposed in the housing 1 and comprises at least one second bus trunk 41, so that at least one cable can be inserted through the second bus trunk 41 to the first bus trunk 23 of the camera module 2 to receive and record the video taken by the camera module 2.

The present invention is characterized in that:

The adjustment tenon 3 is connected to the camera module 2, and the rotary shafts 212 serve as fulcrums of the rotary shafts 212 during adjustment. The housing 1 is formed with an adjustment slot 124 and a mounting unit 123 for mounting of the adjustment tenon 3, and the adjustment tenon 3 is movable along the adjustment slot 124 and can be fixed to the mounting unit 123.

The housing 1 is further provided with at least one wire port 129 for insertion of at least one wire L, so that the wire L can be connected to the second bus trunk 41 of the vehicle drive recording module 4, and the vehicle drive recording module 4 can be a vehicle audio.

The vehicle drive recording module 4 can also be a function module capable of recording GPS (global position system) position and acceleration data, so that the location and speed can be recorded when an accident occurs.

To summarize, the viewing angle adjustable vehicle camera device in accordance with the present invention can be easily and quickly adjusted to obtain an optimum viewing angle.

The mounting unit 123 of the above embodiments is disposed at the inner rear surface of the housing 1.

The adjustment slot 124 in the aforementioned embodiments is located at the rear of the housing 1.

The adjustment slot 124 in the aforementioned embodiments is formed on a lateral surface (left or right surface) of the housing 1, at the rear of the housing 1 is disposed a display which is connected to the camera module 2 to display the video taken by the camera module 2 (connecting a display to the camera module 2 is of conventional art, which is therefore not shown).

While we have shown and described various embodiments in accordance with the present invention, it is clear to those skilled in the art that further embodiments may be made without departing from the scope of the present invention.

What is claimed is:

1. A viewing angle adjustable vehicle camera device comprising a housing, a camera module and an adjustment tenon;

the housing being formed in the front thereof with an opening, and in the center of the opening being defined a viewing aperture for allowing the camera module to record video, in the opening being formed two slide grooves which provide space for the camera module to rotate;

the camera module including a base, a camera, and a first bus trunk, the base being provided at a front surface thereof with a central cylinder and two rotary shafts around a periphery of the central cylinder, the rotary shafts being inserted in the slide grooves, the camera being received in the central cylinder of the base, the first bus trunk allowing the camera module to output signals;

the adjustment tenon being disposed behind the camera module to adjust the viewing angle of the camera;

the viewing angle adjustable vehicle camera device being characterized in that:

the adjustment tenon is connected to the camera module, and the rotary shafts serve as fulcrums of the rotary shafts during viewing angle adjustment, the housing is formed with an adjustment slot and a mounting unit for mounting of the adjustment tenon, and the adjustment tenon is movable along the adjustment slot and capable of being fixed to the mounting unit.

2. The viewing angle adjustable vehicle camera device as claimed in claim 1, wherein the housing is provided with a plurality of engaging grooves, and the adjustment tenon is provided on a rear surface thereof with at least one horizontal rib to engage with one of the engaging grooves of the mounting unit.

3. The viewing angle adjustable vehicle camera device as claimed in claim 1, wherein the adjustment tenon is formed with a threaded hole in which being screwed a bolt, so that the adjustment tenon can be more stably fixed in the mounting unit of the housing.

4. The viewing angle adjustable vehicle camera device as claimed in claim 1, wherein the opening is V-shaped.

5. The viewing angle adjustable vehicle camera device as claimed in claim 1, wherein a display is disposed at the rear of the housing and is connected to the camera module to display the video taken by the camera module.

6. A viewing angle adjustable vehicle camera device comprising a housing, a camera module, an elastic member and an adjustment tenon;
  the housing being formed in the front thereof with an opening, and in the center of the opening being defined a viewing aperture for allowing the camera module to record video, in the opening being formed two slide grooves which provide space for the camera module to rotate;
  the camera module including a base, a camera, and a first bus trunk, the base being provided at a front surface thereof with a central cylinder and two rotary shafts around a periphery of the central cylinder, the rotary shafts being inserted in the slide grooves, the camera being received in the central cylinder of the base, the first bus trunk allowing the camera module to output signals;
  the elastic member having both ends abutted against an inner surface of the opening of the housing and the camera module, respectively;
  the adjustment tenon being disposed behind the camera module to adjust the viewing angle of the camera;
  the viewing angle adjustable vehicle camera device being characterized in that:
  the adjustment tenon is connected to the camera module, and the rotary shafts serve as fulcrums of the rotary shafts during viewing angle adjustment, the housing is formed with an adjustment slot and a mounting unit for mounting of the adjustment tenon, the adjustment tenon is movable along the adjustment slot, and the elastic member pushes the adjustment tenon to fix the adjustment tenon to the mounting unit.

7. The viewing angle adjustable vehicle camera device as claimed in claim 6, wherein the housing is provided with a plurality of engaging grooves, and the adjustment tenon is provided on a rear surface thereof with at least one horizontal rib to engage with one of the engaging grooves of the mounting unit.

8. The viewing angle adjustable vehicle camera device as claimed in claim 6, wherein the adjustment tenon is formed with a threaded hole in which being screwed a bolt, so that the adjustment tenon can be more stably fixed in the mounting unit of the housing.

9. The viewing angle adjustable vehicle camera device as claimed in claim 6, wherein the opening is V-shaped.

10. The viewing angle adjustable vehicle camera device as claimed in claim 6, wherein the elastic member is a spring.

11. The viewing angle adjustable vehicle camera device as claimed in claim 6, wherein a display is disposed at the rear of the housing and is connected to the camera module to display the video taken by the camera module.

12. A viewing angle adjustable vehicle camera device comprising a housing, a camera module, an adjustment tenon, and a vehicle drive recording module;
  the housing being formed in the front thereof with an opening, and in the center of the opening being defined a viewing aperture for allowing the camera module to record video, in the opening being formed two slide grooves which provide space for the camera module to rotate;
  the camera module including a base, a camera, and a first bus trunk, the base being provided at a front surface thereof with a central cylinder and two rotary shafts around a periphery of the central cylinder, the rotary shafts being inserted in the slide grooves, the camera being received in the central cylinder of the base, the first bus trunk allowing the camera module to output signals;
  the elastic member having both ends abutted against an inner surface of the opening of the housing and the camera module, respectively;
  the vehicle drive recording module being disposed in the housing and comprising at least one second bus trunk, so that at least one cable is inserted through the second bus trunk to the first bus trunk of the camera module to receive and record the video taken by the camera module;
  the adjustment tenon being disposed behind the camera module to adjust the viewing angle of the camera;
  the viewing angle adjustable vehicle camera device being characterized in that:
  the adjustment tenon is connected to the camera module, and the rotary shafts serve as fulcrums of the rotary shafts during viewing angle adjustment, the housing is formed with an adjustment slot and a mounting unit for mounting of the adjustment tenon, and the adjustment tenon is movable along the adjustment slot and capable of being fixed to the mounting unit.

13. The viewing angle adjustable vehicle camera device as claimed in claim 12, wherein the housing is provided with a plurality of engaging grooves, and the adjustment tenon is provided on a rear surface thereof with at least one horizontal rib to engage with one of the engaging grooves of the mounting unit.

14. The viewing angle adjustable vehicle camera device as claimed in claim 12, wherein the adjustment tenon is formed with a threaded hole in which being screwed a bolt, so that the adjustment tenon can be more stably fixed in the mounting unit of the housing.

15. The viewing angle adjustable vehicle camera device as claimed in claim 12, wherein the housing is further provided with at least one wire port for insertion of at least one wire, so that the wire is connected from the housing to the second bus trunk of the vehicle drive recording module, and the vehicle drive recording module is a vehicle audio.

16. The viewing angle adjustable vehicle camera device as claimed in claim 12, wherein the vehicle drive recording module is disposed in the housing.

17. The viewing angle adjustable vehicle camera device as claimed in claim 12, wherein the vehicle drive recording module is a function module capable of recording GPS position.

18. The viewing angle adjustable vehicle camera device as claimed in claim 12, wherein the vehicle drive recording module is a function module capable of recording acceleration data.

19. The viewing angle adjustable vehicle camera device as claimed in claim 12, wherein the opening is V-shaped.

20. The viewing angle adjustable vehicle camera device as claimed in claim 12, wherein a display is disposed at the rear of the housing and connected to the camera module.

* * * * *